United States Patent [19]

Burkhardt

[11] 3,930,329
[45] Jan. 6, 1976

[54] BAIT MOLDING DEVICE
[76] Inventor: John B. Burkhardt, 429 Woodbine Ave., Westville, N.J. 08093
[22] Filed: Aug. 22, 1974
[21] Appl. No.: 499,631

[52] U.S. Cl. .................. 43/4; 43/42.37; 43/42.53; 81/423; 81/425 A; 249/95
[51] Int. Cl.² ........................................ A01K 97/00
[58] Field of Search ............. 43/4, 1, 42.37, 42.53, 43/44.89; 81/421, 422, 423, 425 A; 249/95, 160; 425/DIG. 34, DIG. 57; 426/512

[56] References Cited
UNITED STATES PATENTS

| 1,259,141 | 3/1918 | Schoenman | 249/95 |
| 2,263,340 | 11/1941 | Kraemer | 249/95 X |
| 2,643,418 | 6/1953 | Auldridge | 43/42.53 X |
| 3,171,132 | 3/1965 | Dritz | 81/423 UX |
| 3,289,246 | 12/1966 | Deye | 425/DIG. 57 |

Primary Examiner—Louis G. Mancene
Assistant Examiner—Daniel J. Leach
Attorney, Agent, or Firm—Charles F. Duffield, Esq.

[57] ABSTRACT

A bait molding device for forming and securing moldable bait material such as bread dough about a fishhook. A mold is formed of two cup shaped mold sections which are secured to pliers-like devices for opening and closing of the mold sections. The molds are of an elongate configuration to accommodate an entire fishhook and moldable bait material surrounding the fishhook within the mold sections. One of the mold sections includes a groove through one of the edges of the mold to permit the fishing line attached to the hook to pass through the mold when closed.

4 Claims, 2 Drawing Figures

BAIT MOLDING DEVICE

BACKGROUND OF INVENTION

One common form of bait used for fishing is bread dough or dough balls. This type of bait is used by embedding a fishhook within the dough ball or otherwise forming the dough ball around the hook. Most generally, the bait is molded around the entire hook.

One of the problems encountered in molding the bait around the hook is obtaining sufficient adhesion of the molded material to itself and around the hook to prevent the bait from separating from the hook. The present method employed by fishermen is simply to attempt to apply enough pressure to the bait material between the fingers to create the necessary adhesion of the material to itself and around the hook to prevent loss. This is often a difficult and time consuming job and is likewise not very satisfactory.

Another problem which is encountered in hand molding the bait upon the hook is the end shape or form of the molded bait. It is preferable to have the bait uniformly and evenly molded around the hook and, in many cases, of a form which can be easily swallowed by the fish. Hand forming of the moldable bait material about the hook often falls very short of the desired form and shape of the bait upon the hook.

OBJECT AND SUMMARY OF INVENTION

It is the object of the present invention to provide a mechanical bait molding device for forming moldable bait material around a fishhook of the desired shape while also creating the necessary molding pressures to acquire the necessary adhesion of the material upon the hook.

The bait molding device of the present invention carries out the foregoing object by the utilization of a bait mold which is formed of two cup shaped mold members which engage one another at mold engaging edges. The mold members are carried in the jaws of a pliers like device which permits the mold sections to be opened and closed with the necessary pressure.

One of the mold sections includes a groove in the mold engaging edge of the section. The groove permits the fishing line attached to the fishing hook to pass between the mold sections when they are closed without severing the line. The mold sections are of a complementary configuration and, in one embodiment, are of an elongate configuration permitting the entire fishhook to be placed within the mold and enclosed within the bait material.

DETAILED DESCRIPTION OF INVENTION

Figure 1:
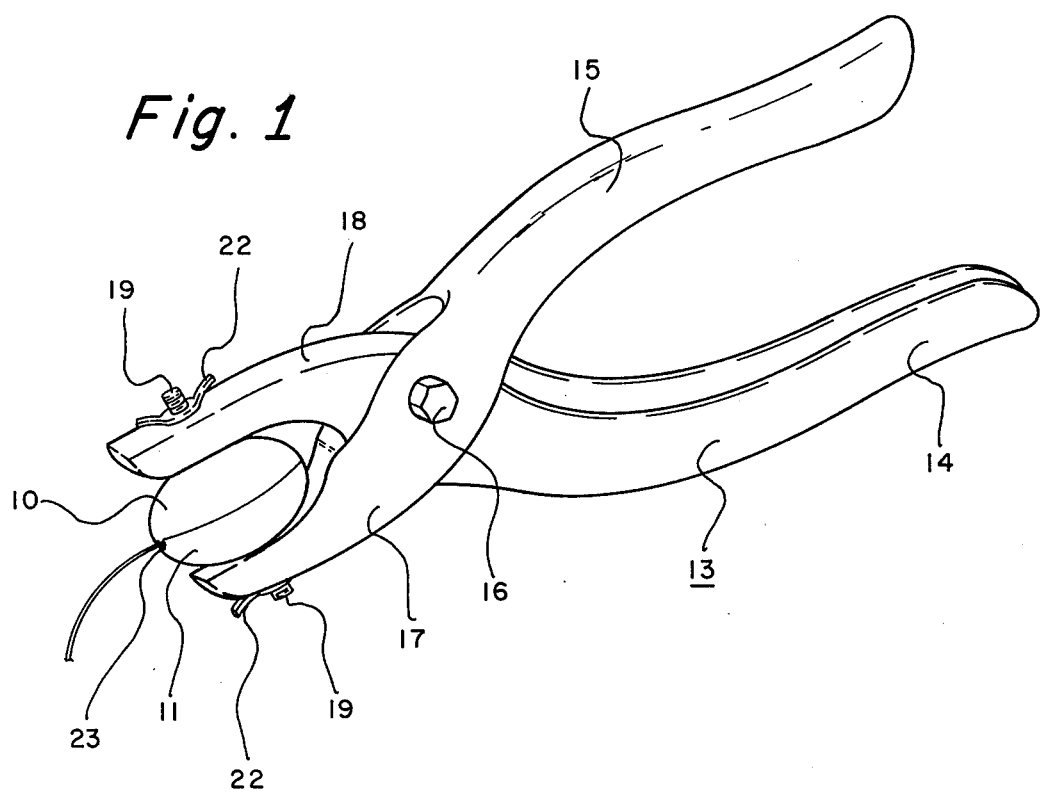
FIG. 1 of the drawing is a perspective view of the bait molding device of the present invention in closed position.
Figure 2:
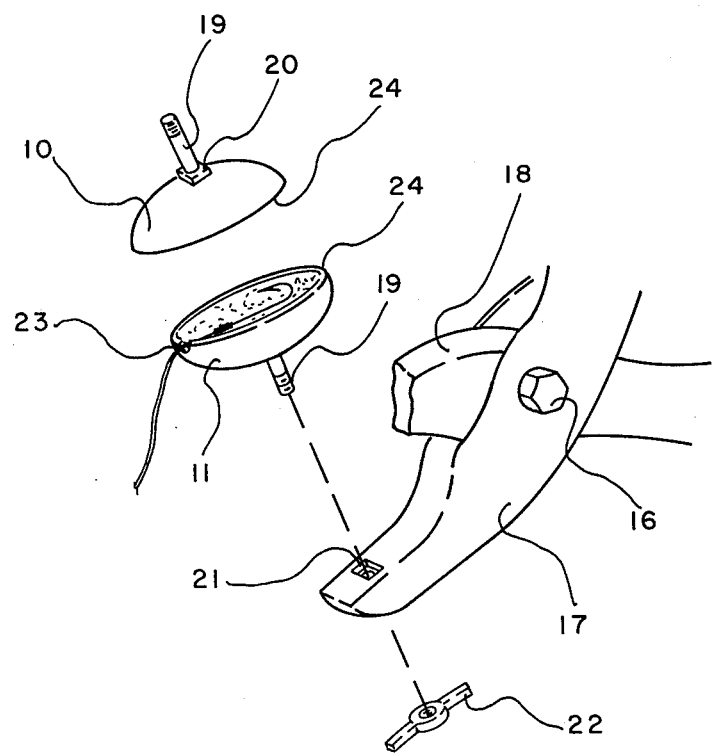
FIG. 2 of the drawing is an exploded view of a portion of the bait molding device in open position.

A specific embodiment of the bait molding device of the present invention is shown in FIGS. 1 and 2 of the drawing. A pair of opposed cup shaped mold sections 10 and 11 are provided which, in closed position as shown in FIG. 1, define a hollow closed mold.

The mold sections 10 and 11 are carried and supported by a pair of pliers 13. The pliers include handles 14 and 15 which are secured together by a pivot pin 16 and extend beyond the pivot pin 16 as jaws 17 and 18.

As may be seen from the drawing, each of the mold sections 10 and 11 is secured to one of the jaws of the pliers. Each of the mold sections has an extending securing bolt 19 projecting from the central portion of the mold section. At the base of the securing bolt there is disposed a square alignment shoulder 20.

The mold sections 10 and 11 are assembled to the jaws of the pliers as shown in FIGS. 1 and 2. The securing bolt of each of the sections passes through a corresponding alignment aperture 21 in the jaw of the pliers. The alignment aperture 21 is of a mating configuration to the alignment shoulder 20 on the mold section. Once the mold section is in place in the jaw, a conventional wing nut 22 is threaded upon the securing bolt to hold the mold section in place upon the jaw of the pliers.

A groove 23 is disposed in a thin lower mold engaging edge 24 of the mold section 11. The groove passes through the entire edge of the mold section and is of a size just large enough to permit the fishing line to nest within the groove without being engaged by the thin complementary mold edge of the upper mold section 10 when in closed position. In this manner, an entire fishhook can be disposed within the mold.

In a specific embodiment, the mold sections 10 and 11 are preferably of an elongate configuration taken in the plane of the mold engaging edges 24. The long axis of the elongate configuration is in alignment with the groove 23. In this manner, the fishing line and shank of the fishhook will be in alignment when placed in the mold.

In a further preferred embodiment, the mold sections 10 and 11 are of a shallow cup shape rather than a full hemispherical configuration. In this manner, the resultant configuration of the bait molded about the hook is further elongated in a section taken in a plane both perpendicular to the plane of the parting line between the two mold sections and parallel to the long axis of the mold sections. In this manner, the resultant configuration of the molded bait is one which is best suited to the configuration of the mouth of the fish.

In using the bait molding device of the present invention, a suitable quantity of the bait molding material, such as bread dough, is loosely placed around the fishhook. Thereafter, the dough and included fishhook is placed between the mold sections with the fishing line placed in the groove 23. The pliers are then closed bringing the mold sections together compressing the bait upon the fishhook. Any excess bait material will be extruded from the mold past the mold engaging edges as the mold sections are brought together. When the mold sections have finally closed, the excess bait will be cut off by the thin mold engaging edges of the mold and the bait will be molded to the required configuration for consumption by the fish and at the same time there will have been sufficient pressure generated upon the moldable bait material to insure its adhesion to itself and upon the fishhook. Thereafter, the pliers are simply opened and the molded bait and included hook removed from the molding device ready for use.

While a preferred embodiment of the invention has been shown in the drawing and described in the specification, various changes may be made to the invention by those skilled in the art without departing from the spirit of the invention as defined in the appended claims. Therefore, no specific limitation as to the scope of the invention was intended by the particular embodiment thereof disclosed.

I claim:

1. A bait molding device for forming and securing moldable bait material such as bread dough about a fishhook comprising:
    a hollow mold formed of two cup shaped mold sections, each having complementary thin mold engaging edges;
    means for supporting the mold sections for movement between open and closed positions; and
    a groove in one of the mold engaging edges adapted to accommodate a fishing line whereby the mold sections may be forcibly closed upon a fishhook surrounded by moldable bait material placed between the mold sections to compress and secure the bait upon the hook.

2. The bait molding device of claim 1 wherein each mold section is of an elongate configuration to accommodate an entire fishhook between the mold sections.

3. The bait molding device of claim 2 wherein the groove in the mold engaging edge is in alignment with the long axis of the mold.

4. The bait molding device of claim 1 wherein the means for supporting the mold sections are pliers like devices including pivoted handles and jaws and wherein the mold sections are secured between the jaws.

* * * * *